United States Patent
Shiina

(10) Patent No.: US 9,201,479 B2
(45) Date of Patent: Dec. 1, 2015

(54) DEBUG SYSTEM, ELECTRONIC CONTROL UNIT, INFORMATION PROCESSING UNIT, SEMICONDUCTOR PACKAGE, AND TRANSCEIVER CIRCUIT

(71) Applicant: Renesas Electronics Corporation, Kawasaki-shi (JP)

(72) Inventor: Takahiro Shiina, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 203 days.

(21) Appl. No.: 13/655,312

(22) Filed: Oct. 18, 2012

(65) Prior Publication Data
US 2013/0191657 A1 Jul. 25, 2013

(30) Foreign Application Priority Data
Oct. 21, 2011 (JP) .................. 2011-231538

(51) Int. Cl.
G06F 1/26 (2006.01)
G06F 11/36 (2006.01)
G06F 1/32 (2006.01)

(52) U.S. Cl.
CPC .............. *G06F 1/26* (2013.01); *G06F 1/3287* (2013.01); *G06F 11/3648* (2013.01); *Y02B 60/1282* (2013.01)

(58) Field of Classification Search
None
See application file for complete search history.

(56) References Cited

U.S. PATENT DOCUMENTS

| | | |
|---|---|---|
| 5,454,008 A | 9/1995 | Baumann et al. |
| 5,701,306 A | 12/1997 | Arai |
| 6,192,303 B1 | 2/2001 | Takakura et al. |
| 6,922,794 B2 | 7/2005 | Tagawa et al. |
| 7,210,064 B2 | 4/2007 | Mayer |
| 8,159,058 B2 | 4/2012 | Ishikawa et al. |
| 2002/0184561 A1 | 12/2002 | Tagawa et al. |
| 2003/0074180 A1* | 4/2003 | Shibayama et al. ............ 703/28 |
| 2006/0236171 A1* | 10/2006 | Hu et al. ....................... 714/724 |

(Continued)

FOREIGN PATENT DOCUMENTS

| | | |
|---|---|---|
| JP | H 08-62298 A | 3/1996 |
| JP | 9-44372 A | 2/1997 |

(Continued)

OTHER PUBLICATIONS

European Search Report dated May 6, 2013.

(Continued)

*Primary Examiner* — Paul Yanchus, III
(74) *Attorney, Agent, or Firm* — McGinn IP Law Group, PLLC

(57) ABSTRACT

Disclosed is a debug system that suppresses the supply of extra electrical power for functions disused in the future while maintaining the performance of communication between an electronic control unit and an external unit for development. The debug system includes an electronic control unit that has a microcomputer for controlling the operation of a control target, a transceiver circuit that is capable of communicating data with the microcomputer, and an external unit for development that is capable of rapidly communicating data with the transceiver circuit. The electronic control unit includes a power supply unit for supplying electrical power to the microcomputer. The transceiver circuit operates on electrical power supplied from an external power supply unit, which differs from the power supply unit included in the electronic control unit.

20 Claims, 16 Drawing Sheets

(56) References Cited

U.S. PATENT DOCUMENTS

| | | |
|---|---|---|
| 2007/0294583 A1 | 12/2007 | Traskov et al. |
| 2009/0027058 A1* | 1/2009 | Ishii et al. .................... 324/500 |
| 2011/0077793 A1* | 3/2011 | Hsieh et al. ................... 700/297 |

FOREIGN PATENT DOCUMENTS

| | | |
|---|---|---|
| JP | H 10-2248 A | 1/1998 |
| JP | 2001-084161 A | 3/2001 |
| JP | 2001-291833 A | 10/2001 |
| JP | 2002-358212 A | 12/2002 |
| JP | 2009-070965 A | 4/2009 |
| JP | 2010-134511 A | 6/2010 |

OTHER PUBLICATIONS

Japanese Office Action dated Jun. 2, 2015 with an English translation.

* cited by examiner

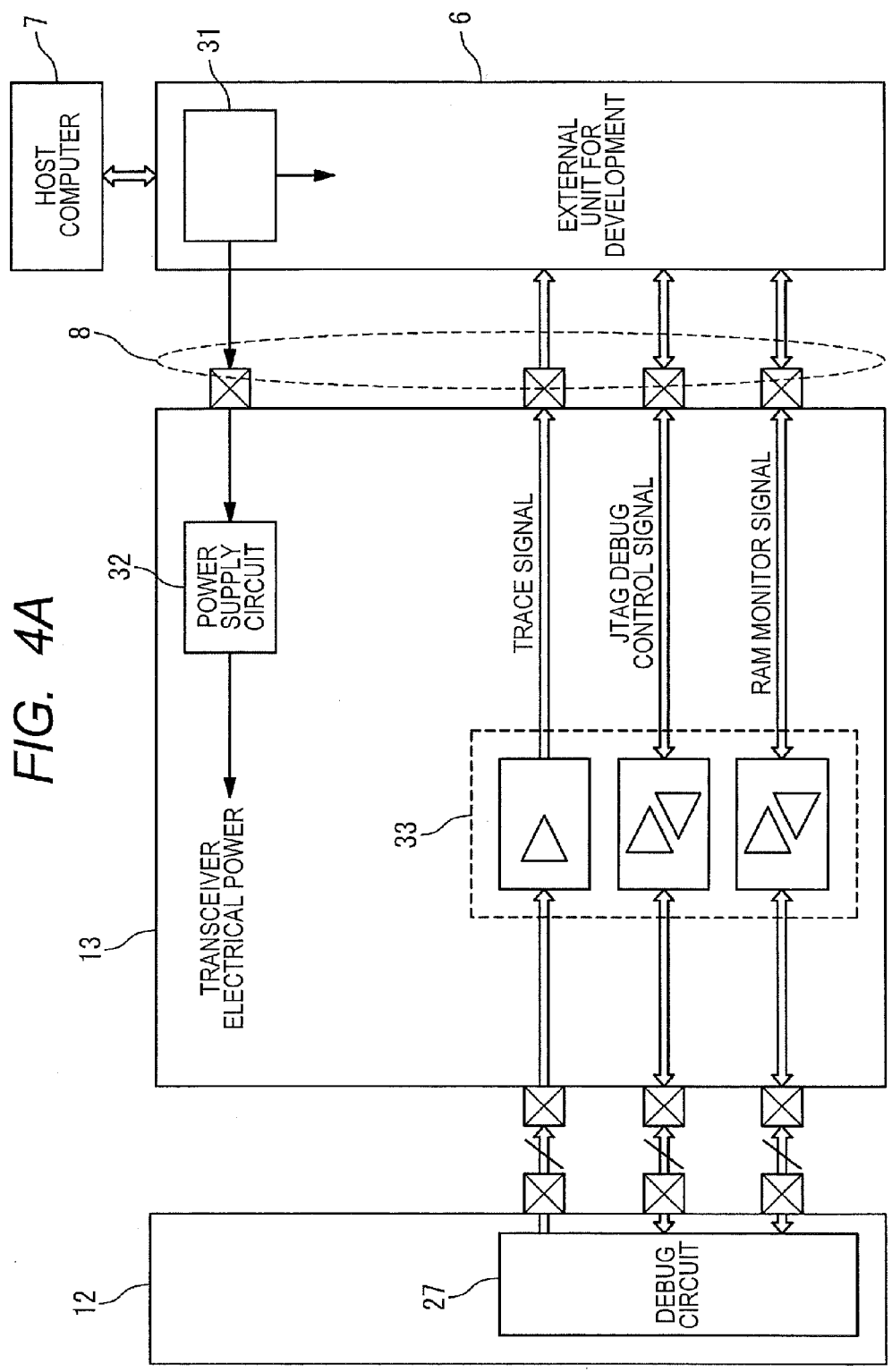

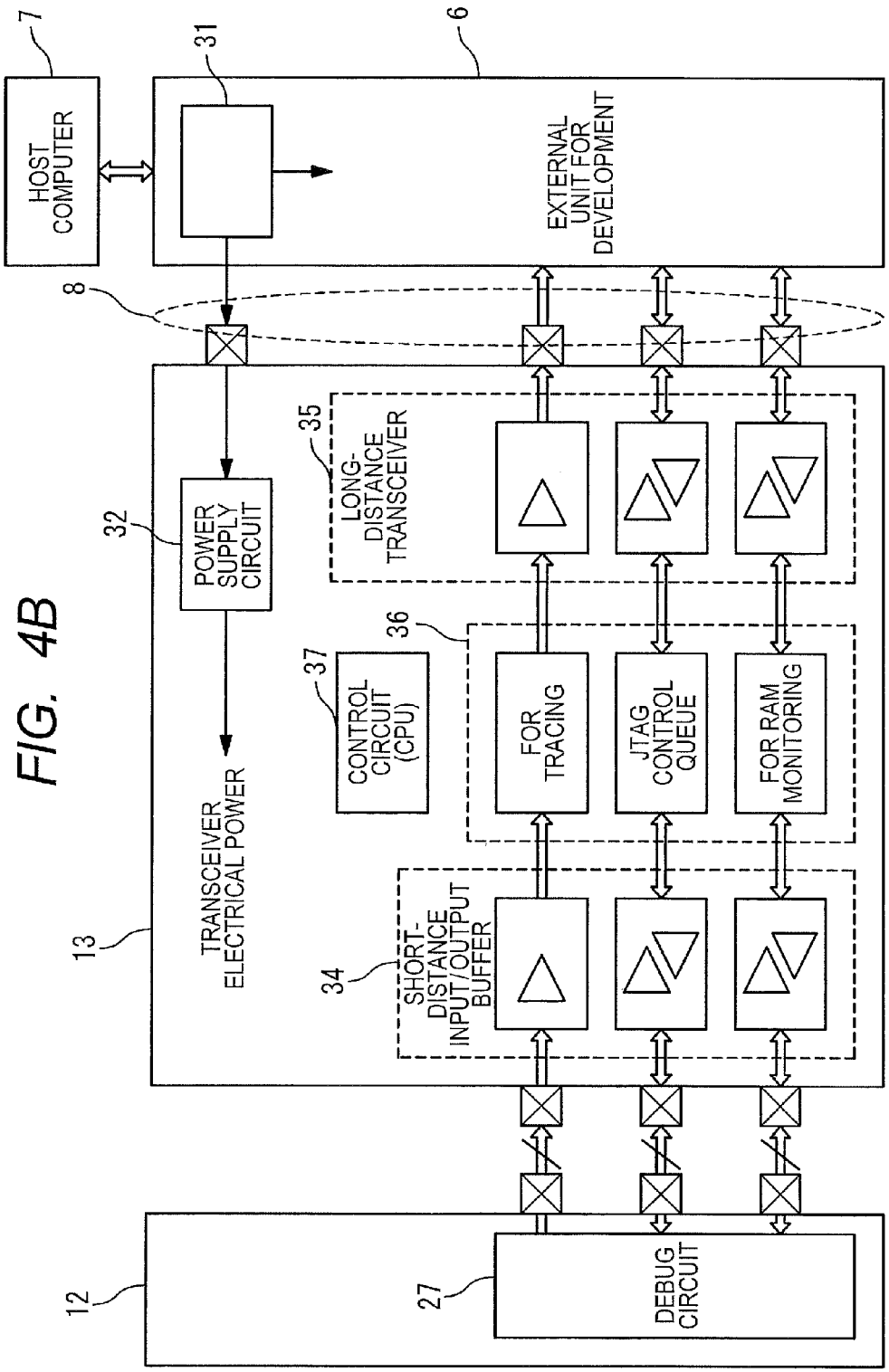

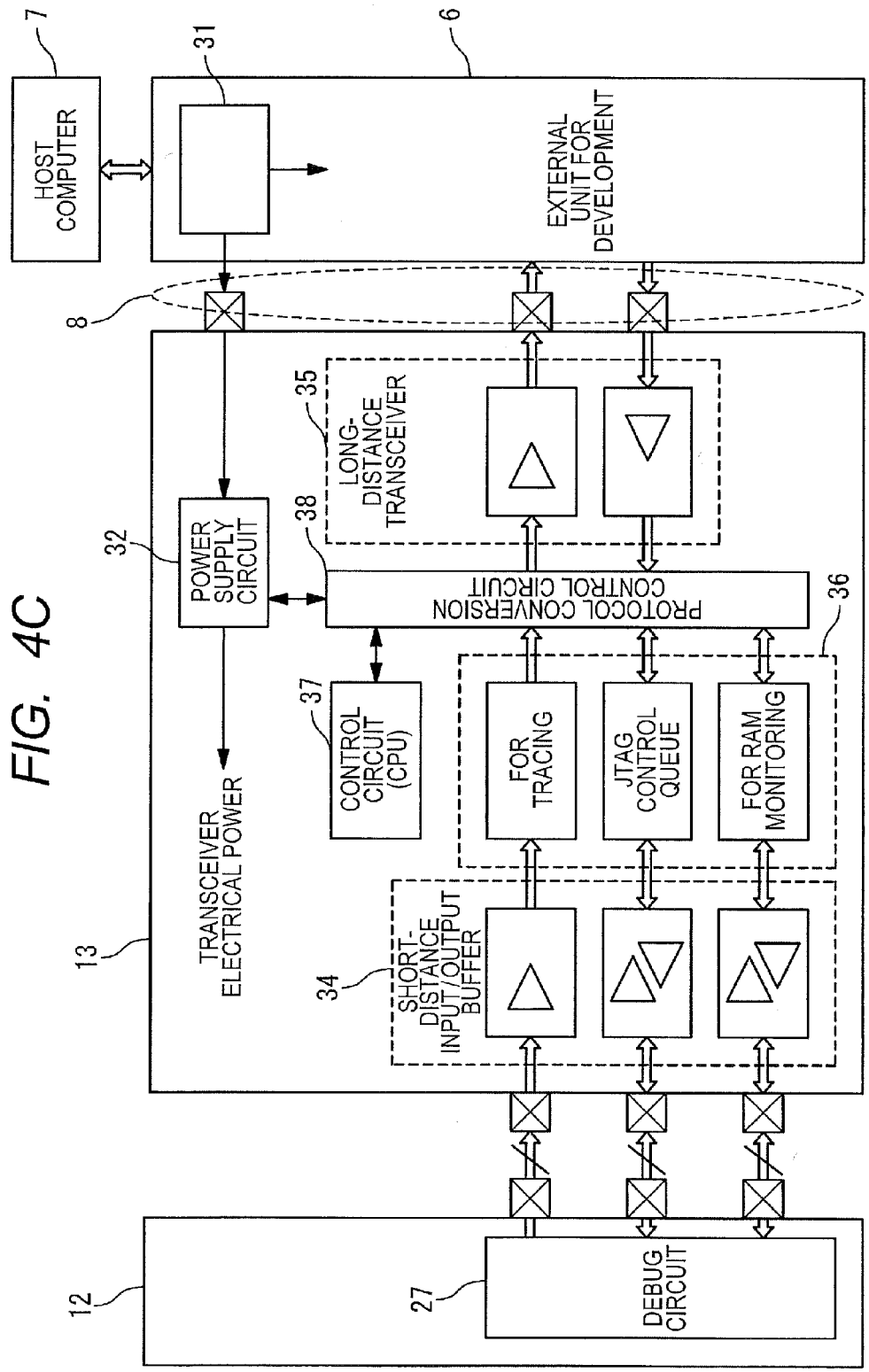

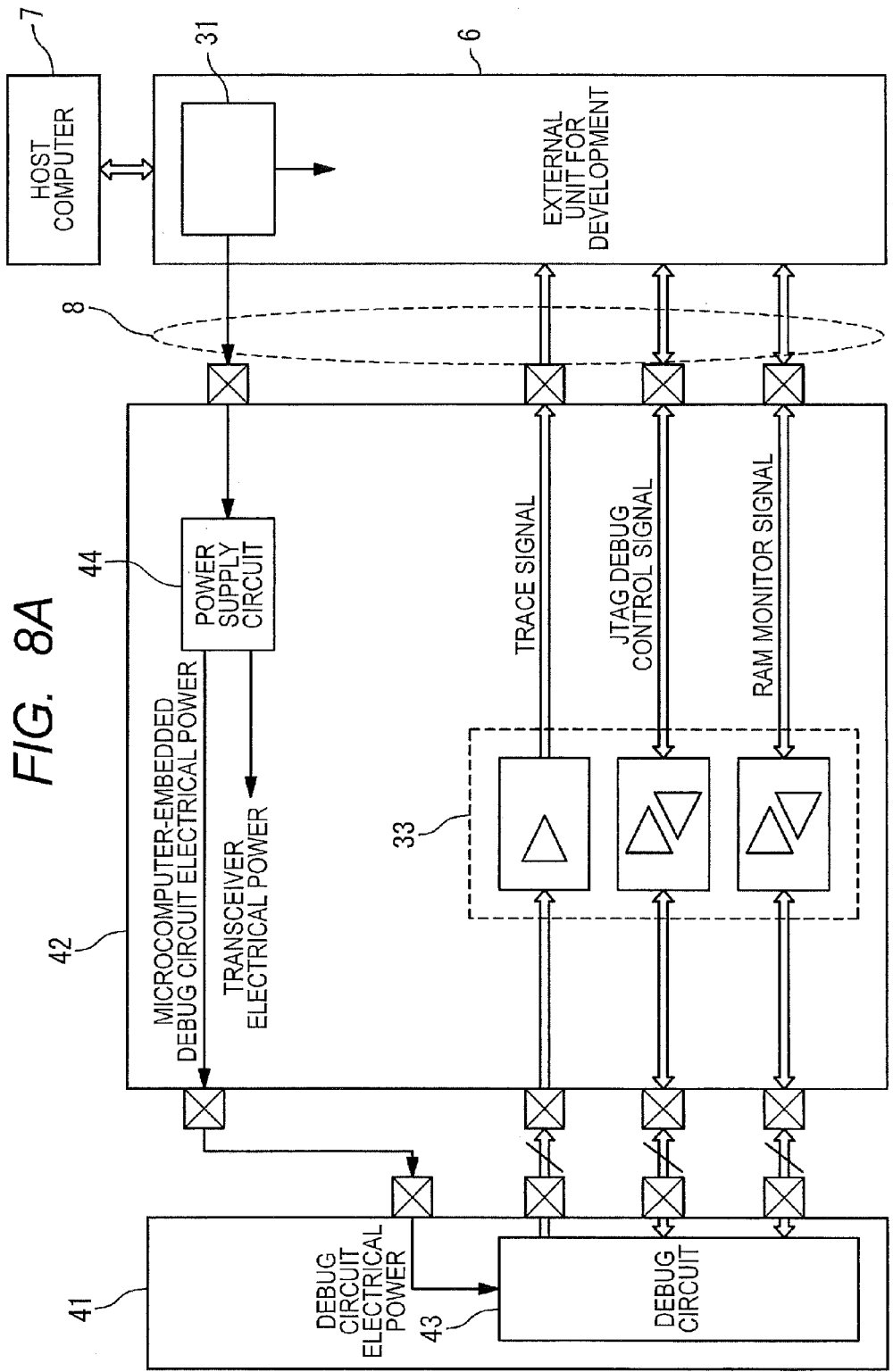

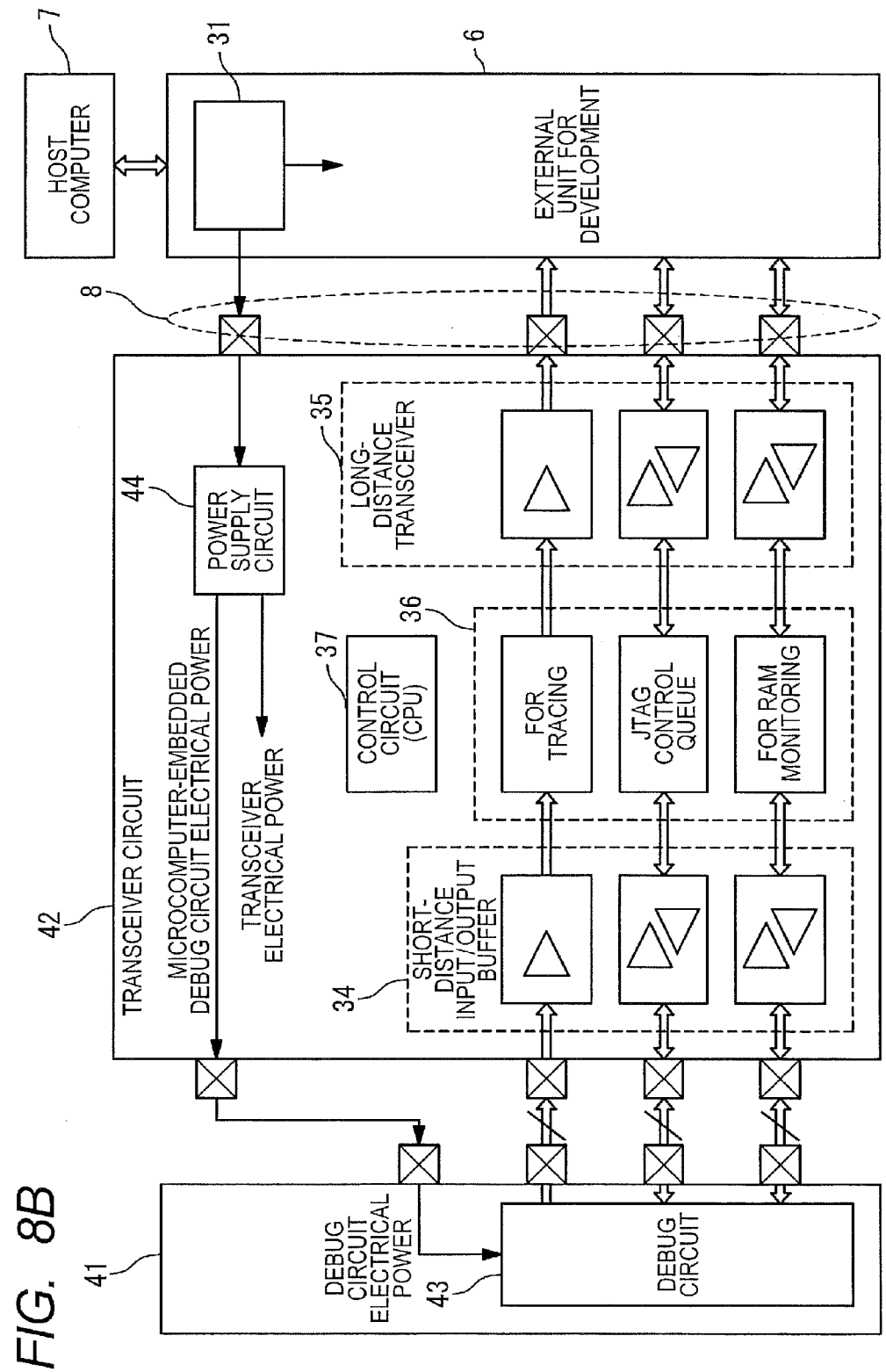

DEBUG SYSTEM, ELECTRONIC CONTROL UNIT, INFORMATION PROCESSING UNIT, SEMICONDUCTOR PACKAGE, AND TRANSCEIVER CIRCUIT

CROSS-REFERENCE TO RELATED APPLICATIONS

The disclosure of Japanese Patent Application No. 2011-231538 filed on Oct. 21, 2011 including the specification, drawings, and abstract is incorporated herein by reference in its entirety.

BACKGROUND

The present invention relates to an information processing unit. The invention also relates to a technology that the information processing unit uses to establish specific communication with an external unit, for example, to a technology effective for a microcomputer having a communication function.

Many hardware products having an electronic control unit (ECU) have been widely used due to advanced electronic control technologies. For example, in most of vehicles, ships, airplanes, and other moving bodies, an electronic control unit is used to control, for instance, engines and navigation equipment. An information processing unit having a microcomputer (e.g., LSI) is built in such an electronic control unit.

When a hardware product having an electronic control unit (ECU) is to be designed, various tests are conducted at stages, for instance, of prototype production and outgoing inspection for the purpose of verifying the operations of a target to be controlled by the electronic control unit (ECU) and checking for faults in the electronic control unit (ECU). In currently marketed automobiles, for example, a plurality of electronic control units (ECUs) are used to provide engine control and vehicle control. For example, an electronic control unit (ECU) for engine control is equipped, for instance, with a power train control microcomputer. An electronic control unit (ECU) for vehicle control is equipped, for instance, with a chassis control microcomputer that controls an electrically-assisted power steering motor. The microcomputer in the electronic control unit (ECU) is provided with a debug circuit that outputs the results (software execution results and computed data) obtained when a control target device (e.g., engine or motor) is controlled. At stages, for instance, of prototype production and outgoing inspection, data derived from the debug circuit in the microcomputer is transferred to a development unit external to the electronic control unit (ECU) and used to check the operations of the electronic control unit (ECU). A known technology disclosed, for instance, in Japanese Unexamined Patent Publication No. Hei 9 (1997)-44372 adjusts an electronic control unit (ECU) provided for a vehicle by arbitrarily correcting data used for control operations by a microcomputer.

A technology described in Japanese Unexamined Patent Publication No. Hei 9 (1997)-44372 makes it possible to check for improper communication and transfer data between the electronic control unit and a controller before a power supply system switch for the electronic control unit is turned on. A technology described in Japanese Unexamined Patent Publication No. Hei 9 (1997)-44372 makes it possible to prevent erroneous control caused by a communication error and initiate ROM emulation and RAM monitoring upon startup. Another technology described in Japanese Unexamined Patent Publication No. Hei 9 (1997)-44372 relates to a system that has an electronic control unit for providing engine control with a control CPU and a controller coupled to communicate with the control CPU.

In the system disclosed in Japanese Unexamined Patent Publication No. Hei 9 (1997)-44372, the electronic control unit includes an evaluation board and an input/output board. A control CPU is mounted on the evaluation board. Input/output terminals for various signals are mounted on the input/output board. The electronic control unit turns on when an ignition switch is placed in the ON position. When a power switch for the controller is turned on, electrical power is supplied only to the evaluation board in the electronic control unit through the controller.

The above technologies described in Japanese Unexamined Patent Publication No. Hei 9 (1997)-44372 prevent a control target from being erroneously controlled due to an error in the communication between the electronic control unit and the controller. The technologies described in Japanese Unexamined Patent Publication No. Hei 9 (1997)-44372 also make it possible to initiate ROM emulation and RAM monitoring immediately after the power supply system switch for the electronic control unit is turned on.

SUMMARY

When an automotive power train system is to be tested, control targets (engine and motor) and an electronic control unit (ECU) are placed in a space such as a bench room. A control room in which a worker performs operations and makes measurements is located at a distance from the bench room. In some cases, therefore, the electronic control unit (ECU) may be positioned at a distance of 5 m or longer from an external unit for development arranged in the control room. Further, when a running test with an actual vehicle is conducted, the electronic control unit (ECU) is placed in an engine room, whereas the external unit for development is placed in a space for occupants or in a cargo room. Therefore, the wiring coupling the electronic control unit (ECU) to the external unit for development is very long, as is the case with the aforementioned long distance between the bench room and the control room.

The electronic control unit (ECU) for automobiles is designed to minimize its electrical power consumption because it operates on an in-vehicle battery (secondary battery). Therefore, it is demanded that the electrical power consumption of the microcomputer built in the electronic control unit (ECU) be also minimized. The debug circuit in the microcomputer needs to operate at a high speed. Therefore, it consumes a larger amount of electrical power when it is used than when it is not used. Further, a transceiver circuit that consumes a large amount of electrical power and requires a large circuit area is necessary when debug information is to be transferred at a high speed and over a long distance while the debug circuit operates at a high speed.

It is generally known that the transceiver circuit, which provides high-speed communication over a long distance, consumes a large amount of electrical power. In recent automobiles, various in-vehicle electric devices need to operate on a limited secondary battery. It is therefore difficult to consider an additional electrical power margin for measurement and operational tests only. Further, a high-speed transceiver circuit cannot easily be miniaturized and increases the size of a chip and the amount of electrical power consumption. Moreover, the debug circuit and the high-seed transceiver circuit are not essential to mass-produced finished electronic control units (ECUs) in most cases. It is extremely difficult to use additional electrical power for functions that will be disused in the future. It is demanded that the supply of extra electrical power for functions disused in the future be suppressed while the performance of communication between the electronic control unit and the external unit for development is maintained.

In order to solve the above problem, according to an aspect of the present invention, there is provided a debug system including an electronic control unit, a transceiver circuit, and an external unit for development. The electronic control unit has a microcomputer for controlling the operation of a control target. The transceiver circuit is capable of communicating data with the microcomputer. The external unit for development is capable of rapidly communicating data with the transceiver circuit. The electronic control unit includes a power supply unit for supplying electrical power to the microcomputer. The transceiver circuit operates on electrical power supplied from an external power supply unit, which differs from the power supply unit included in the electronic control unit.

Electrical power required for communication between the electronic control unit and the external unit for development and electrical power required for debugging are supplied from a source other than an in-vehicle battery. Therefore, a configuration very close to that of an end product can be debugged, measured, and tested.

In short, a representative aspect of the present invention disclosed in this document is advantageous in that it makes it possible to avoid a situation where a secondary battery is requested to have an extra electrical power supply capability, which is irrelevant to the functionality of the electronic control unit, when the electronic control unit operates on the secondary battery.

In other words, stable communication can be established when it is demanded that the external unit for development to be directly coupled to the microcomputer or the external unit for development to be coupled to the electronic control unit having the microcomputer be remotely installable. Stable, high-speed, long-distance communication generally consumes a large amount of electrical power. In such an instance, appropriate test data can be obtained even if the amount of electrical power available for the microcomputer to establish long-distance communication is limited or if the performance or scale of a communication circuit is limited due to an employed semiconductor manufacturing technology.

BRIEF DESCRIPTION OF THE DRAWINGS

Embodiments of the present invention will be described in detail based on the following figures, in which:

FIG. 4A is a block diagram illustrating a configuration of a transceiver circuit 13;

FIG. 4B is a block diagram illustrating another configuration of the transceiver circuit 13;

FIG. 4C is a block diagram illustrating still another configuration of the transceiver circuit 13;

FIG. 8A is a block diagram illustrating a configuration of a transceiver circuit 42 according to the fourth embodiment;

FIG. 8B is a block diagram illustrating another configuration of the transceiver circuit 42 according to the fourth embodiment;

DETAILED DESCRIPTION

Figure 1:
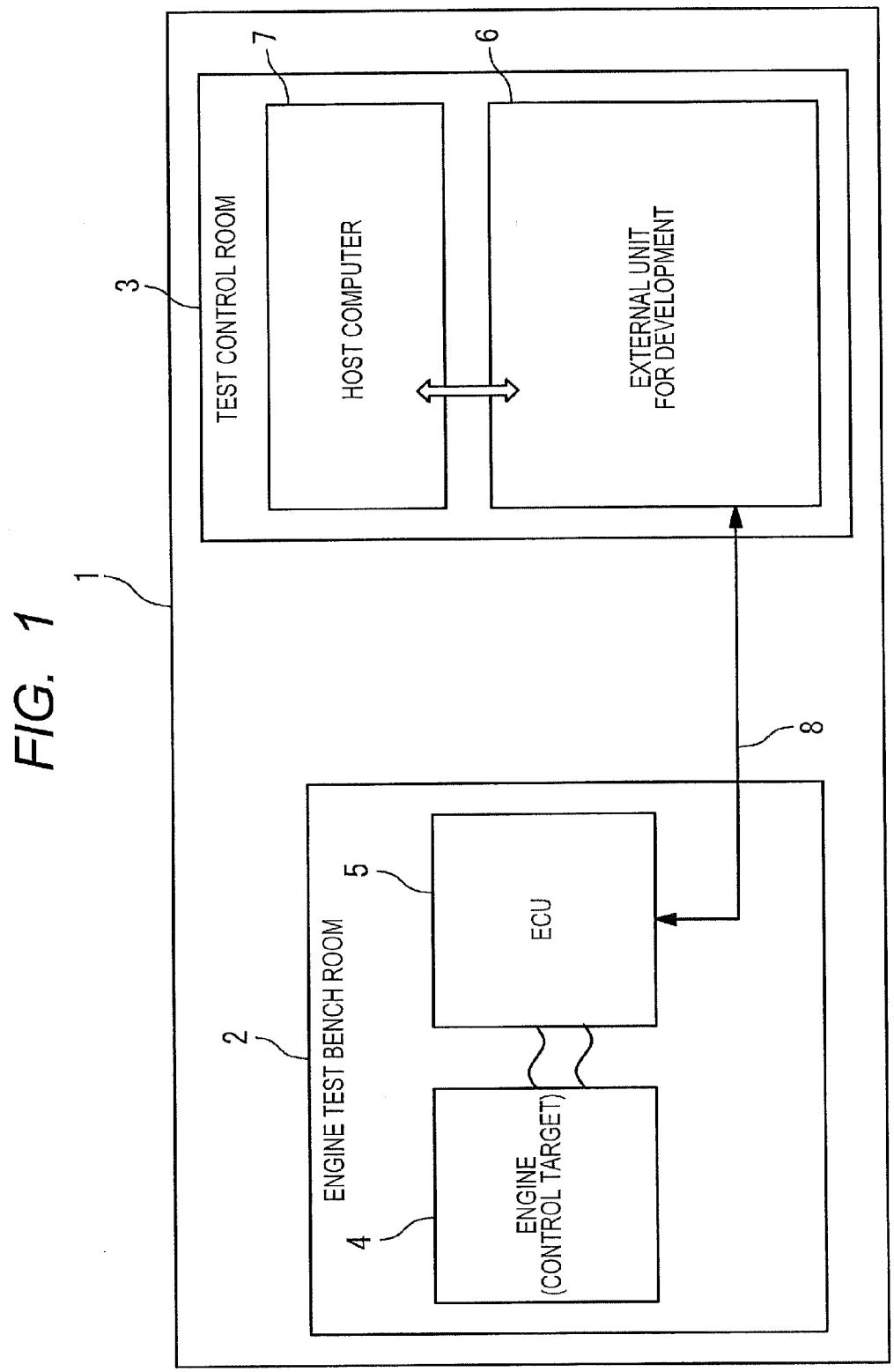
FIG. 1 is a block diagram illustrating a configuration of a debug system 1 for developing an information processing unit provided by the present invention.

Embodiments of the present invention will now be described with reference to the accompanying drawings. In the drawings illustrating the embodiments, like elements are basically designated by the same reference numerals and will not be redundantly described. In order to facilitate the understanding of the present invention, the embodiments of the present invention will be described by illustrating a case where a plurality of in-vehicle electronic control units (ECUs) are tested.

First Embodiment

FIG. 1 is a block diagram illustrating a configuration of a debug system 1 for developing an information processing unit provided by the present invention. The system configuration shown in FIG. 1 is used when a test is conducted before an engine to be developed or the like is mounted in an actual vehicle (completed vehicle). Referring to FIG. 1, the debug system 1, which is used for conducting a test before an engine is mounted in an actual vehicle, includes an engine test bench room 2 and a test control room 3. The engine test bench room 2 includes an engine (control target) 4 and an ECU (electronic control unit) 5. The test control room 3 includes an external unit for development 6 and a host computer 7.

As shown in FIG. 1, the engine test bench room 2 is coupled to the test control room 3 with a long-distance wire 8. Data for debugging and measurement is exchanged through the long-distance wire 8. In the first embodiment, the distance between the engine test bench room 2 in which the engine (control target) 4 and the ECU (electronic control unit) 5 are arranged and the test control room 3 in which a worker conducts tests and makes measurement is much longer than the distance between the engine (control target) 4 and the ECU (electronic control unit) 5 (e.g., 5 m or longer). Further, high-speed communication at a rate between several megabits per second and several hundred megabits per second is established between the ECU (electronic control nit) 5 and the external unit for development 6. Such high-speed data communication is implemented by the long-distance wire 8.

Figure 2:
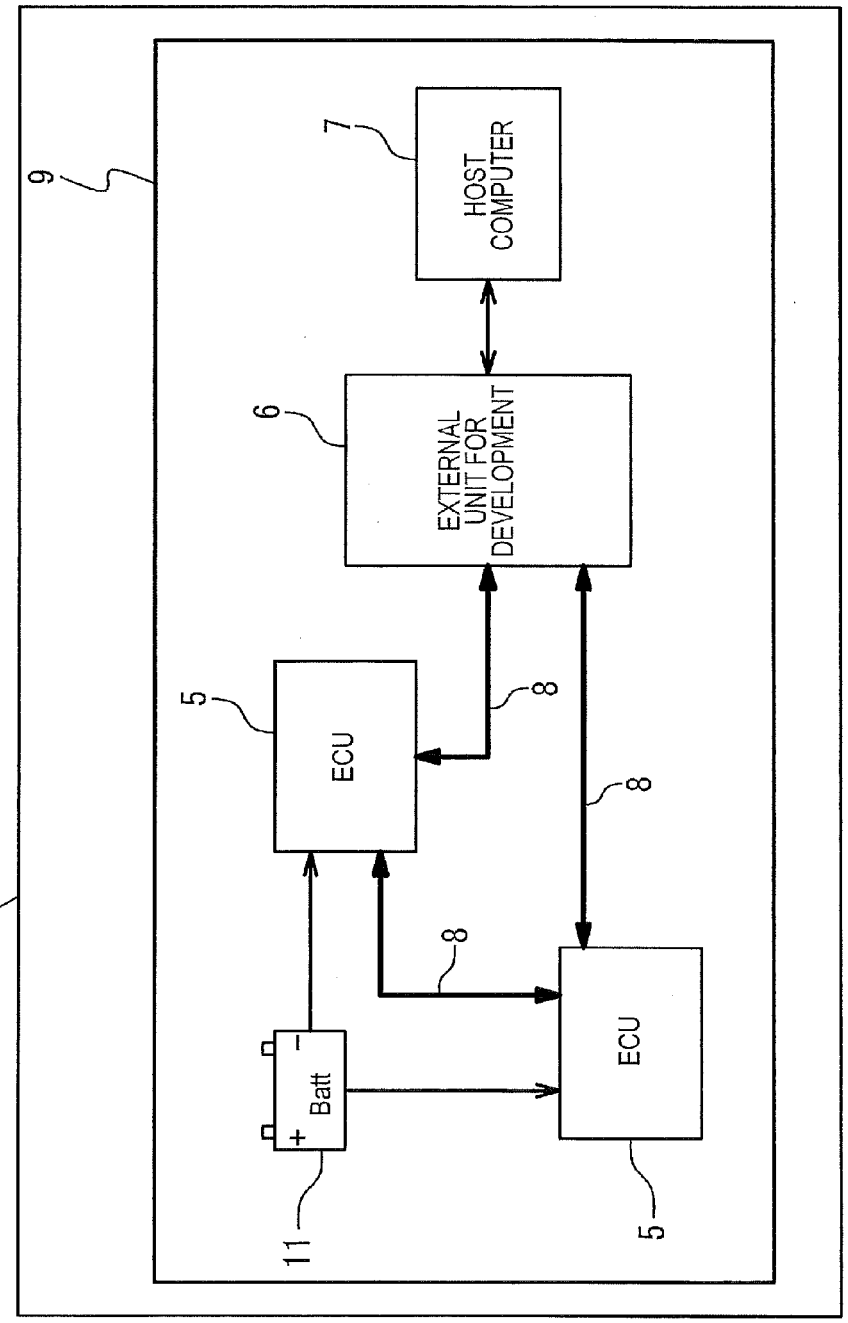
FIG. 2 is a block diagram illustrating another configuration of the debug system 1.

FIG. 2 is a block diagram illustrating another configuration of the debug system 1 for developing the information processing unit provided by the present invention. The system configuration shown in FIG. 2 is used when a test is conducted after the engine to be developed is mounted in an actual vehicle (completed vehicle). As shown in FIG. 2, the debug system 1, which is used for conducting a test after the engine is mounted in an actual vehicle, is configured in a vehicle 9. The vehicle 9 includes an in-vehicle battery 11. The in-vehicle battery 11 supplies electrical power to the ECU (electronic control unit) 5, which is configured in the vehicle 9.

The ECU (electronic control unit) 5 arranged in various sections of the vehicle 9 is coupled to the external unit for development 6 arranged in the vehicle 9 with the long-distance wire 8. When the long-distance wire 8 is to be laid in the vehicle 9, a place where the wire can be routed is limited. Therefore, as is the case with the debug system 1 illustrated in FIG. 1, the distance between the ECU (electronic control unit) 5 and the external unit for development 6 is much longer than the distance between the engine (control target) 4 and the ECU (electronic control unit) 5 (e.g., 1 m or longer).

Figure 3:
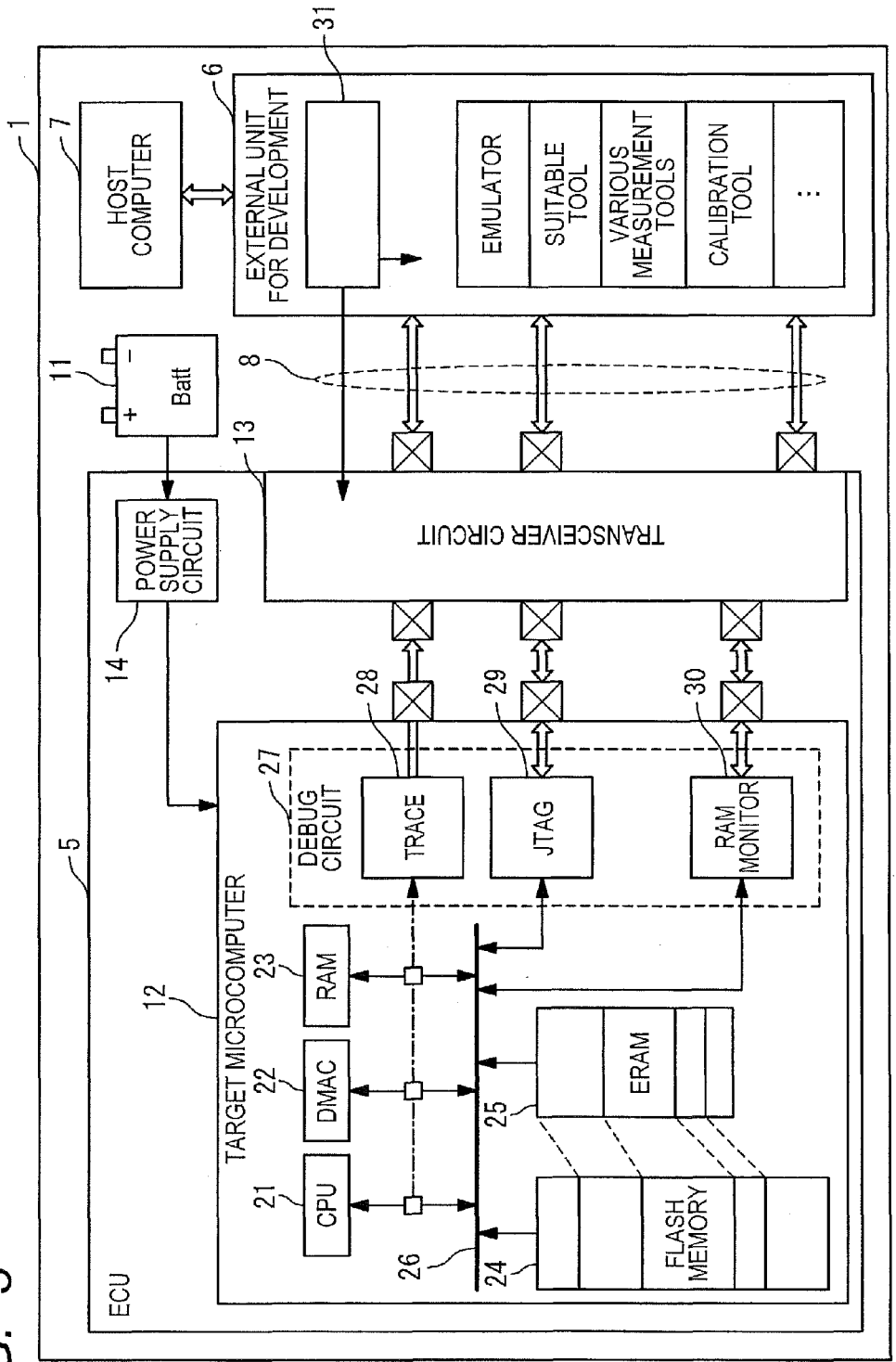
FIG. 3 is a block diagram illustrating a detailed configuration of the debug system 1 according to a first embodiment of the present invention.

FIG. 3 is a block diagram illustrating a detailed configuration of the debug system 1 according to the first embodiment. In order to facilitate the understanding of the present invention, FIG. 3 shows an arbitrary one of a plurality of ECUs (electronic control units) 5 to be developed. In the debug system 1 according to the first embodiment, the ECU 5 includes a target microcomputer 12, a transceiver circuit 13, and a power supply circuit 14. The external unit for development 6 includes an external power supply 31 and various development tools. The power supply circuit 14 in the ECU 5 is coupled to the in-vehicle battery 11. In accordance with electrical power supplied from the in-vehicle battery 11, the power supply circuit 14 generates electrical power for driving the target microcomputer 12 and supplies the generated electrical power to the target microcomputer 12. The present embodiment may be configured so that the ECU 5 includes a plurality of target microcomputers 12 in relation to the transceiver circuit 13.

As shown in FIG. 3, the target microcomputer 12 includes a CPU (central processing unit) 21, a DMAC (Direct Memory Access Controller) 22, a RAM (Random Access Memory) 23, a flash memory 24, and an ERAM (Emulation RAM) 25. These components are coupled through a bus 26. The CPU 21 is a functional block that performs central arithmetic processing in the target microcomputer 12. The RAM 23 is formed by a semiconductor device and used as a storage unit that can be directly accessed by the CPU 21. The RAM 23 functions as a main memory (main storage unit) in the target microcomputer 12. The DMAC 22 is a functional block that functions to permit data transfer between the RAM 23 and a peripheral device without using the CPU. The flash memory 24 retains a computer program that is to be executed by the CPU 21. The ERAM 25 is a memory that temporarily stores a correction program, a correction data value, and the like without directly rewriting the flash memory 24 when the computer program retained in the flash memory 24 is to be corrected.

The target microcomputer 12 also includes a debug circuit 27. The debug circuit includes a trace 28, a JTAG 29, and a RAM monitor 30. The trace 28 is a functional block that traces instructions executed by the CPU 21 in the target microcomputer 12. The trace 28 includes a dedicated high-speed interface, directly reads operations of the CPU 21, and supplies large-size data for tracing the operations of the CPU 21 to the external unit for development 6. The JTAG 29 is an interface functional block that establishes communication between the debug circuit 27, which is built in the target microcomputer 12 to exercise a debugging function, and the external unit for development 6 in compliance with a common communication standard. The JTAG 29 provides basic data communication between the external unit for development 6 and the target microcomputer 12, transmits a computer program to the target microcomputer 12, and performs control register setup for the debug circuit 27. The RAM monitor 30 is a functional block that reads a data value stored in the RAM 23 of the target microcomputer 12 when an operational test is conducted on the target microcomputer 12. The RAM monitor 30 includes a dedicated high-speed interface, directly reads data stored in the RAM 23, and supplies the read data to the external unit for development 6.

The transceiver circuit 13 according to the present embodiment receives a signal indicative of internal information about the target microcomputer 12 from the debug circuit 27 and transmits the received signal to the external unit for development 6. The transceiver circuit 13 also receives a signal supplied from the external unit for development 6 and transmits the received signal to the target microcomputer 12. The target microcomputer 12 is generally capable of directly communicating with an emulator or measuring device of the external unit for development 6 as far as such a device is at a distance of shorter than 1 m from the target microcomputer 12. However, to achieve high-speed, long-distance communication, which cannot be implemented by the functionality incorporated in the target microcomputer 12, it is necessary to couple the transceiver circuit 13 to the target microcomputer 12. The transceiver circuit 13 may include, for example, a CPU, a memory, a logic circuit, and an analog circuit in order to deliver target performance. As shown in FIG. 3, the transceiver circuit 13 according to the present embodiment operates on electrical power supplied from the external power supply 31 in the external unit for development 6. For example, a standard technology called "Power over Ethernet (PoE)" can be applied to simultaneously exercise the above communication and power supply functions. PoE is a technology that simultaneously provides a communication line and a power supply at low cost when, for instance, no power supply is available for an access point of Ethernet (registered trademark).

FIG. 4A is a block diagram illustrating a configuration of the transceiver circuit 13 according to the present embodiment. As shown in FIG. 4A, the transceiver circuit 13 according to the present embodiment includes a transceiver power supply circuit 32. The transceiver power supply circuit 32 receives electrical power supplied from the external power supply 31 in the external unit for development 6, adjusts the voltage and current of the received electrical power as appropriate for the transceiver circuit, and generates transceiver electrical power. As the transceiver circuit 13 receives the supply of electrical power from the external unit for development 6, the ECU 5, which is a customer system, does not have to incorporate a function of additionally supplying electrical power to the transceiver circuit 13.

The transceiver circuit 13 illustrated in FIG. 4A also includes a transceiver section 33 for maintaining the performance of communication between the target microcomputer 12 and the external unit for development 6. The transceiver section 33 is a circuit that includes a transmitter, which operates as a transmitting device, and a receiver, which operates as a receiving device.

The debug system 1 according to the present embodiment selectively uses either a bidirectional communication interface or a unidirectional communication interface, which provides output only. In the transceiver circuit 13 illustrated in FIG. 4A, a "JTAG debug control signal" and a "RAM monitor signal" are transmitted and received when bidirectional communication is established through the transceiver section 33.

A "trace signal", which is only output from the target microcomputer 12, is unidirectionally output through the transceiver section 33. An arbitrary circuit design may be applied to the transceiver section 33 as far as it can deliver target performance.

FIG. 4B is a block diagram illustrating another configuration of the transceiver circuit 13 according to the present embodiment. The transceiver circuit 13 illustrated in FIG. 4B includes a transceiver power supply circuit 32 for receiving electrical power supplied from the external unit for development 6, a short-distance input/output buffer (microcomputer side input/output buffer) 34 for maintaining the performance of communication between the target microcomputer 12 and the transceiver circuit 13, and a long-distance transceiver (external unit side input/output buffer) 35 for maintaining the performance of communication between the transceiver circuit 13 and the external unit for development 6.

A FIFO buffer 36, which includes storage devices such as a memory and an F/F, is arranged between the short-distance input/output buffer 34 and the long-distance transceiver 35. Further, a control circuit 37 is incorporated to control the FIFO buffer 36. The control circuit 37 may be formed by a dedicated logic circuit or by a CPU that provides software control.

When the FIFO buffer 36 is used as in the transceiver circuit 13 illustrated in FIG. 4B, changes in a data transfer rate can be absorbed even if the amount of data transferred between the target microcomputer 12 and the external unit for development 6 changes. When the FIFO buffer 36 is separately installed for each interface of the target microcomputer 12, optimum design can be made as appropriate for the protocol of each interface.

For example, a large amount of data is rapidly output from the trace 28 in the debug circuit 27. It is therefore preferred that the employed design permit high-speed operations. Further, as the trace 28 provides data output only, the employed FIFO buffer may merely provide unidirectional data output from the target microcomputer 12 to the external unit for development 6. As the JTAG 29 and the RAM monitor 30 provide bidirectional communication, the FIFO buffer 36 needs to be configured to provide communication from the external unit for development 6 to the target microcomputer 12 and communication from the target microcomputer 12 to the external unit for development 6. Moreover, when the FIFO buffer 36 can be controlled by a CPU, it is possible to stop an unused portion of the transceiver circuit and instruct the transceiver power supply circuit 32 to provide power supply control.

FIG. 4C is a block diagram illustrating still another configuration of the transceiver circuit 13 according to the present embodiment. The transceiver circuit 13 illustrated in FIG. 4C is obtained by adding a protocol conversion control circuit 38 to the transceiver circuit 13 illustrated in FIG. 4B. The transceiver circuit 13 shown in FIG. 4C permits the use of an optimum communication method for the communication between the transceiver circuit 13 and the external unit for development 6. The transceiver circuits 13 shown in FIGS. 4A to 4C, respectively, are each formed by a single semiconductor device (IC chip) that is separate from the target microcomputer 12.

As described earlier, the debug system 1 according to the present embodiment aims, for instance, to let the transceiver circuit 13 establish high-speed, long-distance communication. In some cases, a communication protocol owned by the target microcomputer 12 is unstable in terms of electrical characteristics and noise immunity when used as a long-distance communication protocol. The transceiver circuit 13 illustrated in FIG. 4C applies communication protocol data optimum for long-distance communication, which also covers an interface protocol for the microcomputer, to the communication between the target microcomputer 12 and the external unit for development 6.

When, for instance, the target microcomputer 12 is provided with an interface for the JTAG 29, information indicating what JTAG standard sequences are used to perform what type of data transfer is handled as a chunk of data and used as input data for the long-distance communication protocol. As the long-distance communication protocol makes a data transfer while error correction information and other relevant information are added to transfer information, a JTAG transfer, which is unstable, can be properly made with a steady transfer path. Conversely, JTAG sequence operations and transferred data can be restored from data transmitted through the long-distance communication protocol.

Various technologies are applicable to the long-distance communication protocol. However, when PoE is applied to the long-distance communication protocol, it is possible not only to establish communication but also to provide power supply control. As PoE is an extension of Ethernet, it delivers such communication performance that a rate of 100 Mbps can be obtained over a distance of 100 m. Although the electrical power consumption of the transceiver circuit may increase, no problem arises because PoE supplies electrical power to the transceiver circuit 13 according to the present embodiment.

As described earlier, the ECU 5 includes the target microcomputer 12, which is to be developed; the transceiver circuit 13, which is coupled to the target microcomputer 12; and the power supply circuit 14, which supplies electrical power to the target microcomputer 12. A commonly used in-vehicle battery 11 is used as a power supply for the target microcomputer 12. Meanwhile, the transceiver circuit 13 differs from the target microcomputer 12 in the method of power supply. The external unit for development 6 directly supplies electrical power to the transceiver circuit 13.

In the debug system 1 according to the first embodiment, the target microcomputer 12 and the ECU 5, which incorporates the target microcomputer 12, communicate with external units (external unit for development 6 and host computer 7) through the transceiver circuit 13 while exercising automobile control. A plurality of communication operations are performed, for instance, to verify program operations and reference a memory that stores control parameters.

As indicated in FIG. 3, which was referenced earlier, when the debug system 1 according to the present embodiment is configured as described above, the target microcomputer 12 does not have to include a circuit (transceiver circuit 13) for establishing long-distance, high-speed communication. Further, the transceiver circuit 13 obtains the electrical power for operating itself from an external unit such as the external unit for development 6. Therefore, the ECU 5 does not have to acquire the electrical power used only for long-distance, high-speed communication from a power supply circuit (power supply circuit 14) in the ECU 5. In other words, the debug system 1 according to the present embodiment does not have to acquire the electrical power required for the transceiver circuit 13, which is used for communication purposes, from the in-vehicle battery 11. Consequently, debugging and measurement can be performed while the electrical power consumption is very close to that of an end product.

Moreover, when the PoE technology is applied to the long-distance wire 8, it is possible to provide a communication rate of 100 Mbps and a maximum wiring length of 100 m at low cost. Meanwhile, electrical power having a rated voltage of 48

V and a maximum current of 350 mA (approximately 15 W) can be supplied. This makes it possible to supply adequate electrical power to the transceiver circuit 13 and to a debug circuit and measurement circuit included in the target microcomputer 12. In addition, these functions can be implemented by using a single Ethernet cable to provide increased user-friendliness.

The PoE technology is applied as an exemplary technology for a case where communication is to be established in accordance with an Ethernet-compliant protocol. Other technologies are also applicable as far as they satisfy certain conditions. For example, USB is a technology that simultaneously provides communication and supplies electrical power. The Ethernet cable can also be used as a cable other than an Ethernet network cable. The Ethernet cable includes a combination of eight wires. It can be merely regarded as means of allocating power supply wires and communication wires.

Second Embodiment

Figure 5:
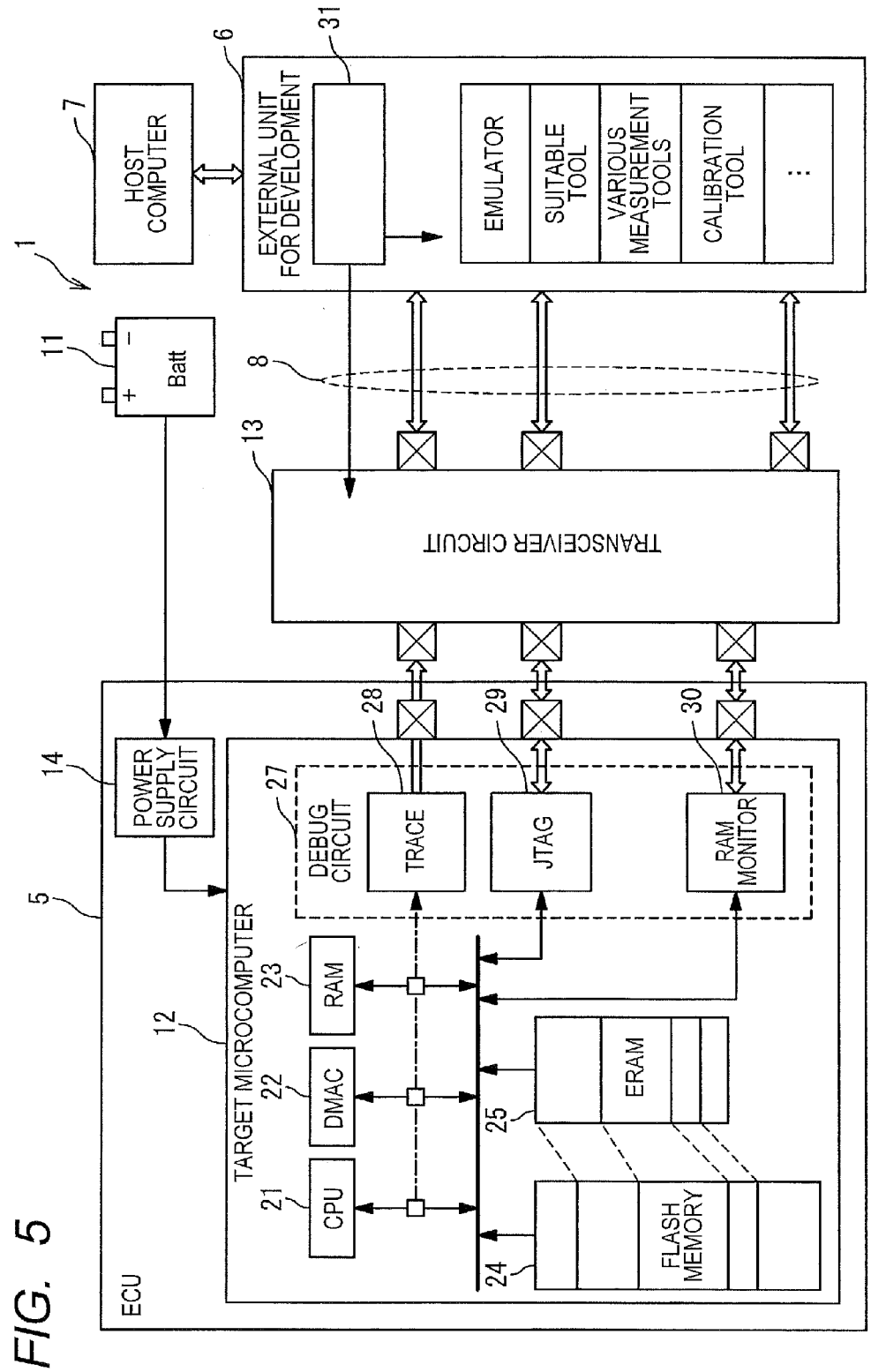
FIG. 5 is a block diagram illustrating the configuration of the debug system 1 according to a second embodiment of the present invention.

A second embodiment of the present invention will now be described. FIG. 5 is a block diagram illustrating the configuration of the debug system 1 according to the second embodiment. As shown in FIG. 5, the debug system 1 according to the second embodiment is configured so that the transceiver circuit 13 is arranged external to the ECU 5. When the ECU 5 is offered as a housing, the ECU housing houses various devices including the target microcomputer 12. Such an ECU housing may not be able to provide an installation space for the transceiver circuit 13, which is used for communication.

The debug system 1 according to the second embodiment is configured so that the transceiver circuit 13 is arranged as an external part to solve the above problem. As the target microcomputer 12 is positioned at a distance from the transceiver circuit 13, an increased burden may be placed on the target microcomputer 12 to maintain the performance of communication. However, when the distance between the target microcomputer 12 and the transceiver circuit 13 is not longer than several tens of centimeters, the increased burden can be compensated for by adopting a general design technique and manufacturing technique.

In the debug system 1 according to the second embodiment, too, long-distance communication is to be established between the transceiver circuit 13 and the external unit for development 6. However, the electrical power required for the transceiver circuit 13 is supplied from the external power supply 31 in the external unit for development 6. Therefore, no load is imposed on the target microcomputer 12 or on the power supply circuit 14. Further, in the debug system 1 according to the second embodiment, the internal configuration of the transceiver circuit 13 is not limited. Therefore, the transceiver circuit 13 may include the circuits illustrated in FIGS. 4A to 4C, as is the case with the first embodiment.

Third Embodiment

Figure 6:
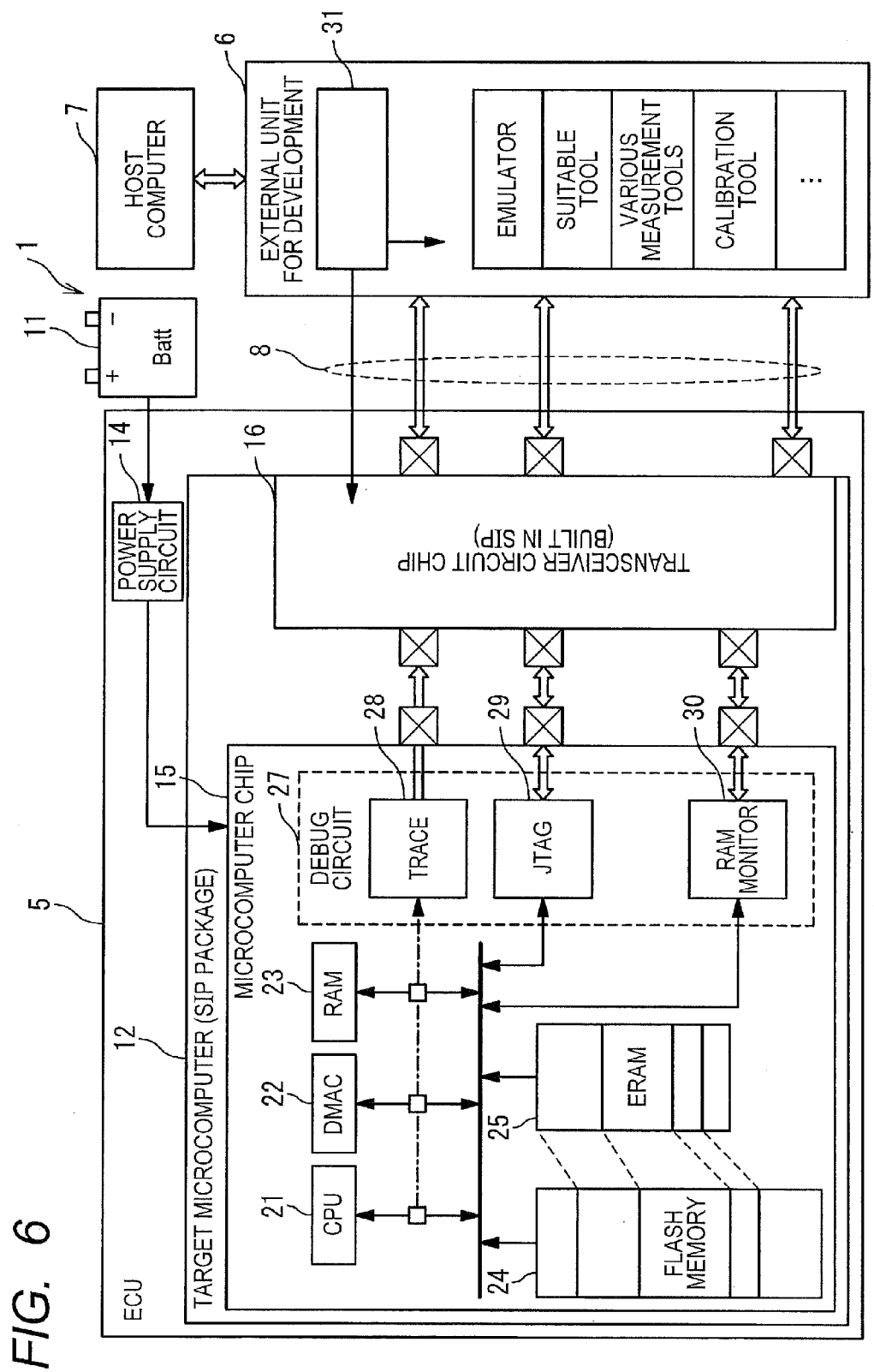
FIG. 6 is a block diagram illustrating the configuration of the debug system 1 according to a third embodiment of the present invention.

A third embodiment of the present invention will now be described. FIG. 6 is a block diagram illustrating the configuration of the debug system 1 according to the third embodiment. In the debug system 1 according to the third embodiment, the target microcomputer 12 mounted in the ECU 5 is formed by a SIP (System In Package). As shown in FIG. 6, a microcomputer chip 15 in the target microcomputer 12 according to the third embodiment is formed by a single semiconductor device (IC chip). Similarly, a transceiver circuit chip 16 is formed by a single semiconductor device (IC chip), which is separate from the microcomputer chip 15.

In the debug system 1 according to the third embodiment, the target microcomputer 12 is offered as a SIP. Therefore, it is not necessary to perform a process of sealing the transceiver circuit chip 16 to another package. Further, the configuration employed in the third embodiment makes it possible to manufacture the microcomputer chip 15 and the transceiver circuit chip 16 as different semiconductor devices (IC chips). Consequently, an optimum design technique and manufacturing technique can be applied as appropriate for their respective functions.

Even when the above-described configuration is employed, a power supply for the microcomputer chip 15 can be separated from a power supply for the transceiver circuit chip 16. Thus, the third embodiment can provide the same advantages as the first and second embodiments. Further, the distance between the microcomputer chip 15 and the transceiver circuit chip 16 is extremely short due to the use of a SIP. This makes it possible to use a mounting method that excels in electrical characteristics. Moreover, in the debug system 1 according to the third embodiment, the internal configuration of the transceiver circuit chip 16 is not limited. Therefore, the transceiver circuit chip 16 may include the circuits illustrated in FIGS. 4A to 4C, as is the case with the first embodiment.

Fourth Embodiment

Figure 7:
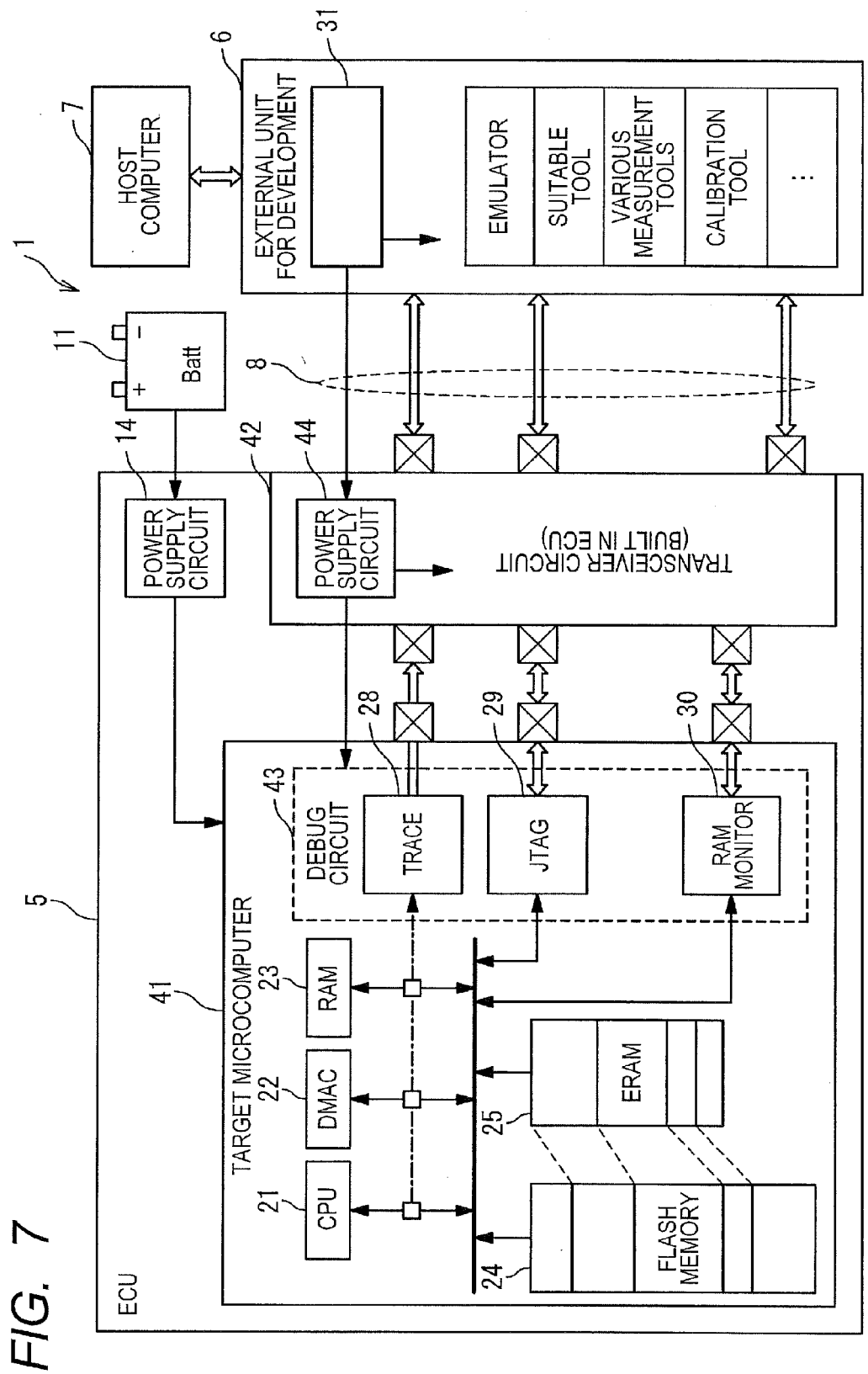
FIG. 7 is a block diagram illustrating the configuration of the debug system 1 according to a fourth embodiment of the present invention.

A fourth embodiment of the present invention will now be described. FIG. 7 is a block diagram illustrating the configuration of the debug system 1 according to the fourth embodiment. As shown in FIG. 7, the ECU 5 in the debug system 1 according to the fourth embodiment includes a target microcomputer 41 and a transceiver circuit 42. The target microcomputer 41 includes a debug circuit 43. The transceiver circuit 42 includes a power supply circuit 44.

As the debug circuit 43 of the target microcomputer 41 operates at a high speed, the target microcomputer 41 with the debug circuit 43 consumes a larger amount of electrical power than the target microcomputer 41 without the debug circuit 43. When the transceiver circuit 42 is applied to the ECU 5 according to the fourth embodiment, it is possible to suppress an increase in the electrical power consumption of the target microcomputer 41.

As shown in FIG. 7, the power supply configuration for the target microcomputer 41 is divided. More specifically, the target microcomputer 41 is designed so that a power supply for main body functions and a power supply for the debug circuit 43 are separated from each other. The electrical power required for the debug circuit 43 is supplied from the power supply circuit 44 included in the transceiver circuit 42. The power supply circuit 44 included in the transceiver circuit 42 is capable of generating electrical power for the transceiver circuit itself and electrical power to be supplied to the debug circuit 43. Configuring the target microcomputer 41 and the transceiver circuit 42 as described above decreases the amount of electrical power consumed when the debug circuit 43 is not used. Therefore, the power supply circuit 14 in the ECU is requested to supply only the electrical power required for the target microcomputer 41.

As the transceiver circuit 42 receives the supply of electrical power from the external unit for development 6, the ECU 5, which is a customer system, does not have to incorporate a function of additionally supplying electrical power to the transceiver circuit 42. In addition, the transceiver circuit 42 is also capable of further supplying the electrical power supplied from the outside to a measurement circuit and debug circuit built in the target microcomputer 41. Using the above-described transceiver circuit 42 makes it possible to reduce an electrical burden imposed on the target microcomputer 41 itself and on the ECU 5. This results in a decrease in the burden imposed on an automobile's battery (in-vehicle battery 11).

Figure 8C:
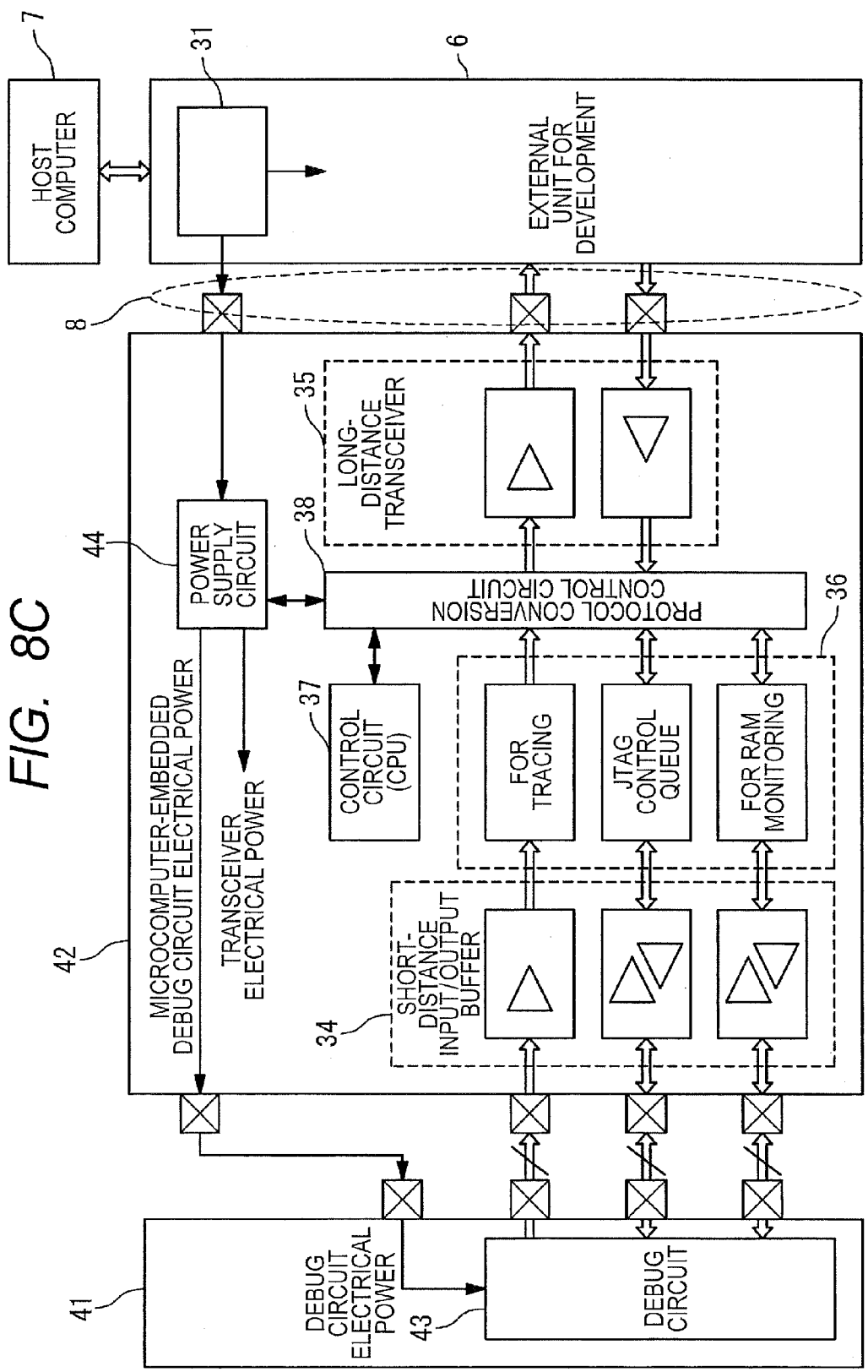
FIG. 8C is a block diagram illustrating still another configuration of the transceiver circuit 42 according to the fourth embodiment.

FIGS. 8A, 8B, and 8C are block diagrams illustrating a configuration of the transceiver circuit 42 according to the fourth embodiment. In the transceiver circuit 42 according to the fourth embodiment, the power supply circuit 44 is capable of operating as a power supply for a plurality of circuits. The power supply circuit 44 in the transceiver circuit 42 is capable of adjusting the voltage and current of the electrical power supplied from the external power supply 31 in the external unit for development 6 as appropriate for the transceiver circuit. This type of power supply circuit is generally built in a semiconductor and may be based, for instance, on a technology for designing a built-in power supply circuit of a microcomputer. In most cases, this type of power supply circuit is not limited to a specific single power supply output and is capable of generating a plurality of power supply voltages.

As shown in FIGS. 8A, 8B, and 8C, the power supply circuit 44 can supply electrical power to the target microcomputer 41. The power supply circuit 44 is capable of receiving electrical power from the external unit for development 6 and supplying the electrical power to another unit such as the target microcomputer 41. The electrical power supplied to the target microcomputer 41 is used to operate the debug circuit 43. The other portion of the transceiver circuit 42 shown in FIGS. 8A to 8C has the same configuration as illustrated in FIGS. 4A to 4C.

Figure 9A:
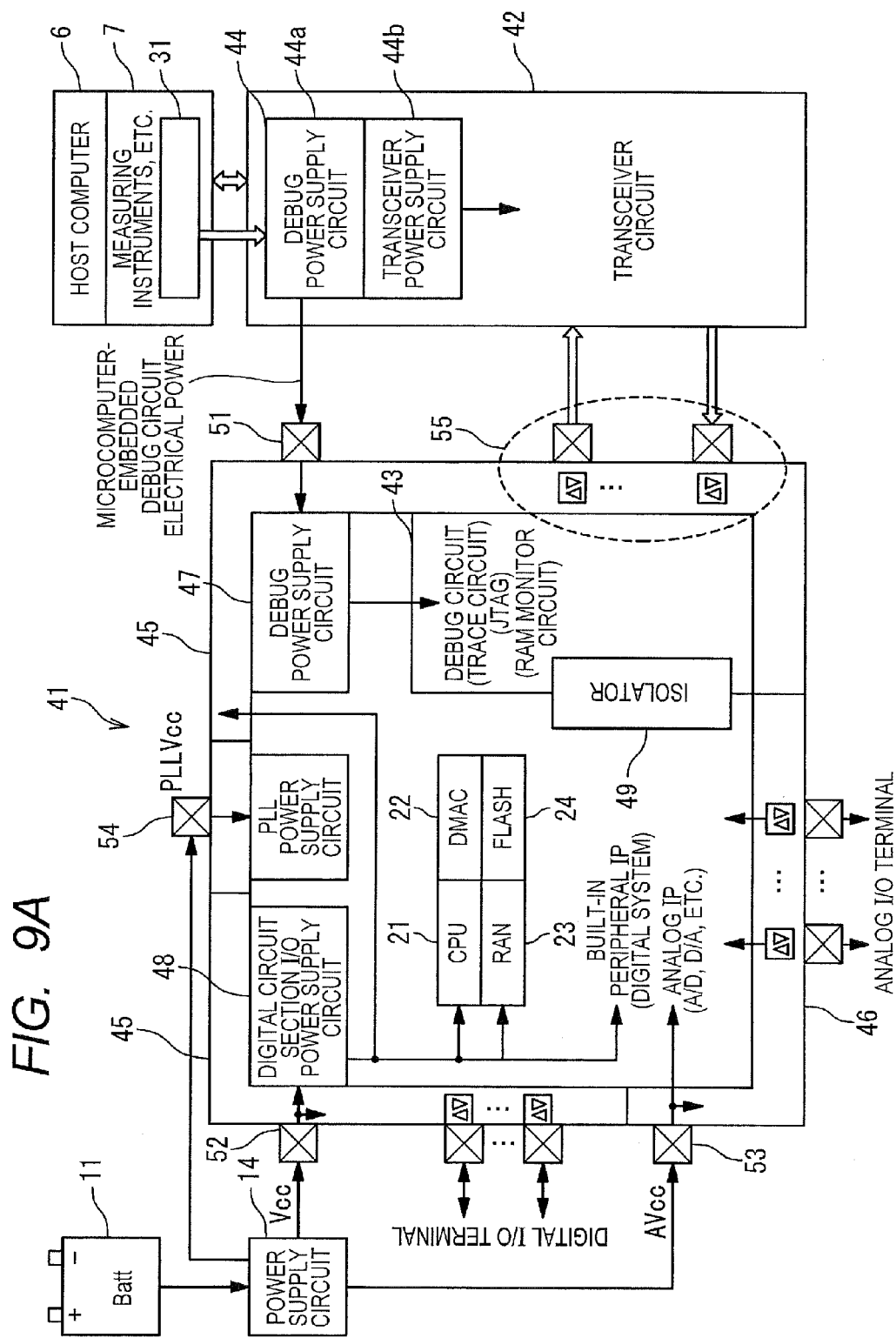
FIG. 9A is a block diagram illustrating a configuration of a target microcomputer 41 according to the fourth embodiment.

FIG. 9A is a block diagram illustrating a detailed configuration of the target microcomputer 41 according to the fourth embodiment. As shown in FIG. 9A, the target microcomputer 41 according to the fourth embodiment includes a digital I/O area 45, an analog I/O area 46, a debug power supply circuit 47, and a digital circuit section I/O power supply circuit 48, and is formed by a single semiconductor device (IC chip). An isolator 49 is arranged between a main body functional block of the target microcomputer 41 and the debug circuit 43. When the debug circuit 43 stops to shut off the supply of electrical power, the isolator 49 inhibits a through current flowing between the main body functional block of the target microcomputer 41 and the debug circuit 43.

The target microcomputer 41 also includes a debug power supply terminal 51, a digital power supply terminal 52, an analog power supply terminal 53, a PLL power supply terminal 54, and a debug circuit dedicated I/O terminal 55. The digital power supply terminal 52, the analog power supply terminal 53, and the PLL power supply terminal 54 are coupled to the power supply circuit 14. The debug power supply terminal 51 is coupled to the power supply circuit 44 in the transceiver circuit 42. The power supply circuit 44 contains a debug power supply circuit 44a and a transceiver power supply circuit 44b. The debug power supply circuit 44a supplies electrical power for the debug circuit built in the microcomputer to the debug power supply circuit 47 through the debug power supply terminal 51.

In accordance with the electrical power received through the digital power supply terminal 52, the digital circuit section I/O power supply circuit 48 generates the electrical power to be supplied to each circuit block in the target microcomputer 41. The digital I/O area 45 operates in accordance with the electrical power supplied from the digital circuit section I/O power supply circuit 48. A part of the digital I/O area 45 functions as an I/O buffer for the debug circuit 43. The debug circuit dedicated I/O terminal 55 couples the I/O buffer for the debug circuit 43 to the transceiver circuit 42.

In the target microcomputer 41 illustrated in FIG. 9A, the common digital I/O area 45 is used to transmit and receive data without providing a dedicated I/O buffer for the debug circuit 43. When the general-purpose digital I/O area 45 is used to multiplex a terminal for the debugging function with a main body function terminal of the target microcomputer 41, the debug circuit 43 can be built in a mounted device. Using the above-described configuration makes it possible not only to receive electrical power for the debug circuit 43, which consumes a large amount of electrical power, but also to implement the target microcomputer 41 having the digital I/O area 45 that operates on electrical power supplied from the digital circuit section I/O power supply circuit 48.

Figure 9B:
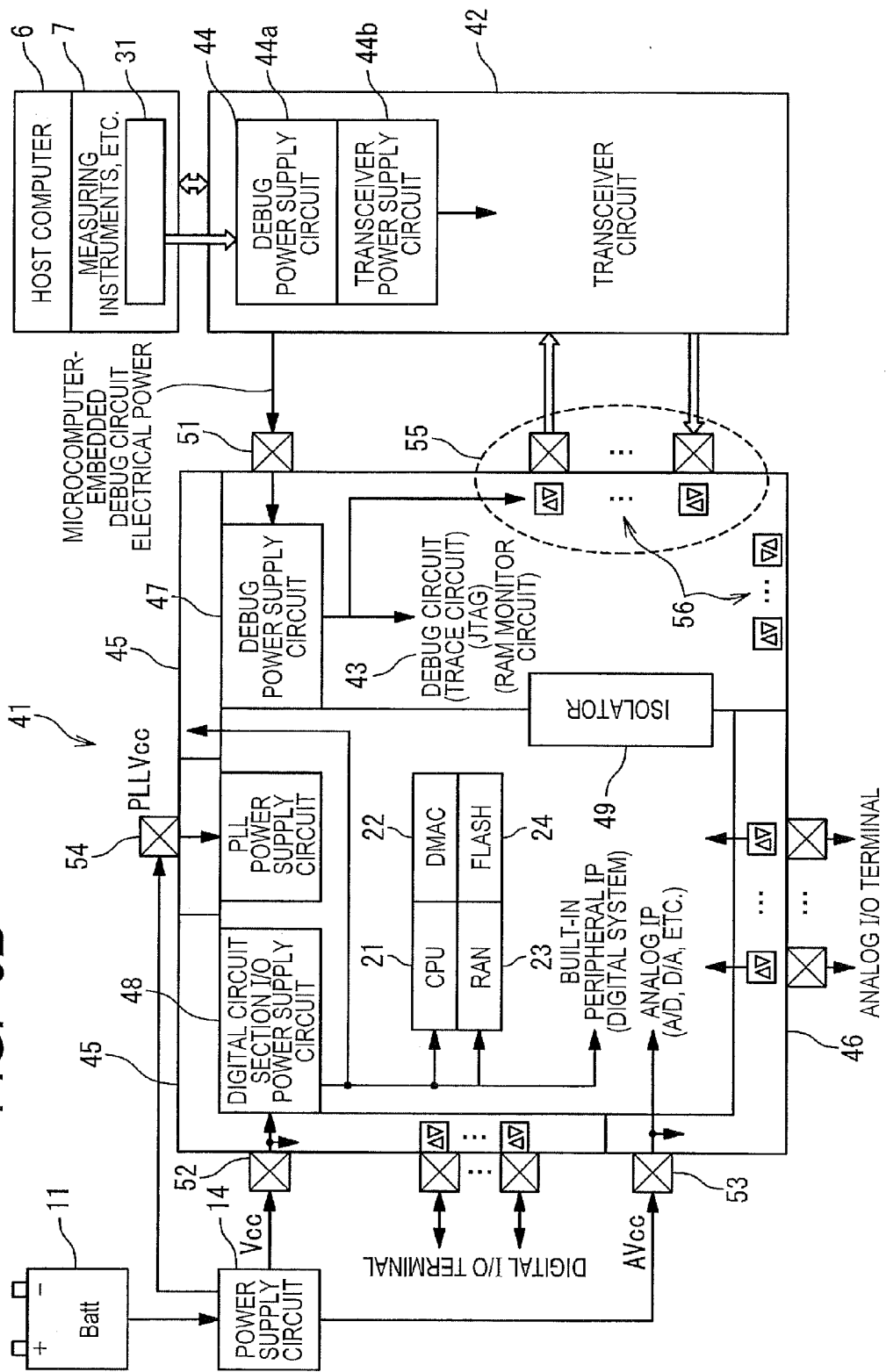
FIG. 9B is a block diagram illustrating another configuration of the target microcomputer 41 according to the fourth embodiment.

FIG. 9B is a block diagram illustrating another configuration of the target microcomputer 41 according to the fourth embodiment. As shown in FIG. 9B, the target microcomputer 41 includes a debug circuit dedicated I/O buffer 56. The debug circuit dedicated I/O buffer 56 is an I/O buffer having special characteristics for supporting a high-speed operation of the debug circuit 43. The debug power supply circuit 47 in the target microcomputer 41 illustrated in FIG. 9B not only supplies electrical power to the debug circuit 43, but also supplies electrical power appropriate for the debug circuit dedicated I/O buffer 56. When the debug circuit 43 stops to shut off the supply of electrical power, the isolator 49 not only inhibits a through current flowing between the main body functional block of the target microcomputer 41 and the debug circuit 43, but also inhibits a through current between the digital I/O area 45 and the analog I/O area 46, on one hand, and the debug circuit dedicated I/O buffer 56, on the other.

As a dedicated I/O buffer is provided for the debug circuit 43 in the target microcomputer 41 illustrated in FIG. 9B, multiplexing of terminals is not required. Hence, the main body function terminal of the target microcomputer 41 is differentiated from another terminal. This makes it possible to provide complete electrical isolation between the functions of the debug circuit 43 and the main body functions of the target microcomputer 41.

Fifth Embodiment

Figure 10:
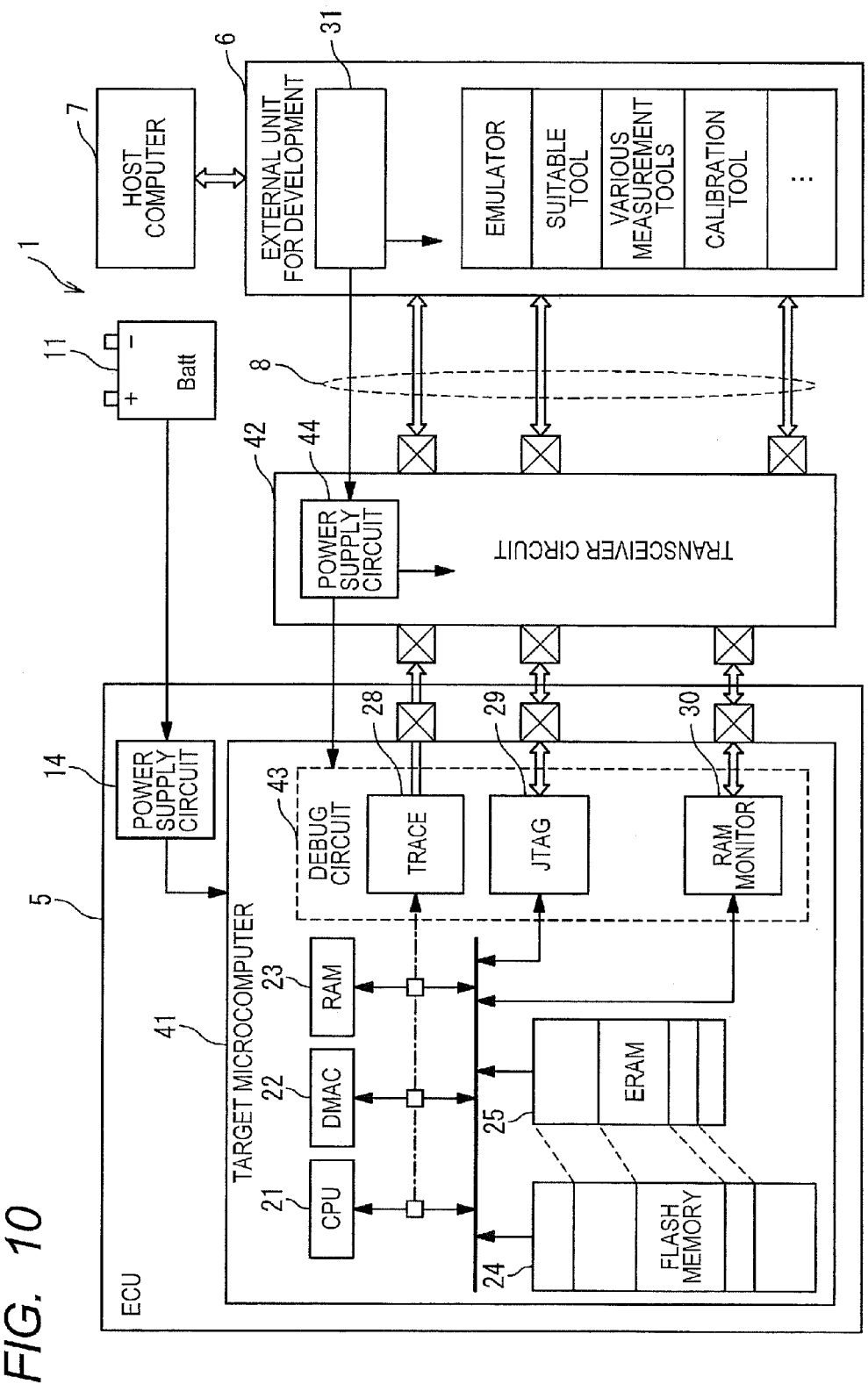
FIG. 10 is a block diagram illustrating the configuration of the debug system 1 according to a fifth embodiment of the present invention.

A fifth embodiment of the present invention will now be described. FIG. 10 is a block diagram illustrating the configuration of the debug system 1 according to the fifth embodiment. As shown in FIG. 10, the debug system 1 according to the fifth embodiment is configured so that the transceiver circuit 42 is arranged external to the ECU 5. Further, the transceiver circuit 42 according to the fifth embodiment includes the power supply circuit 44, which is capable of supplying electrical power to another circuit, as is the case with the transceiver circuit 42 according to the fourth embodiment.

When the ECU 5 is offered as a housing, the ECU housing houses various devices including the target microcomputer 41. Such an ECU housing may not be able to provide an installation space for the transceiver circuit 42, which is used for communication. The debug system 1 according to the fifth embodiment is configured so that the transceiver circuit is arranged as an external part to solve the above problem. As the target microcomputer 41 is positioned at a distance from the transceiver circuit 42, an increased burden may be placed on the target microcomputer 41 to maintain the performance of communication. However, when the distance between the target microcomputer 41 and the transceiver circuit 42 is not longer than several tens of centimeters, the increased burden can be compensated for by adopting a general design technique and manufacturing technique.

In the debug system 1 according to the fifth embodiment, too, long-distance communication is to be established between the transceiver circuit 42 and the external unit for development 6. However, the electrical power required for the transceiver circuit 42 is supplied from the external power supply 31 in the external unit for development 6. Therefore, no load is imposed on the target microcomputer 41 or on the power supply circuit 14.

The power supply circuit 44 in the transceiver circuit 42 is capable of generating electrical power for the transceiver circuit itself and electrical power to be supplied to the debug circuit 43. Configuring the target microcomputer 41 and the transceiver circuit 42 as described above decreases the amount of electrical power consumed when the debug circuit 43 is not used. Therefore, the power supply circuit 14 in the ECU is requested to supply only the electrical power required for the target microcomputer 41. In the debug system 1 according to the fifth embodiment, the internal configuration of the transceiver circuit 42 is not limited. Therefore, the transceiver circuit 42 may include the circuits illustrated in FIGS. 8A to 8C, as is the case with the fourth embodiment.

Sixth Embodiment

Figure 11:
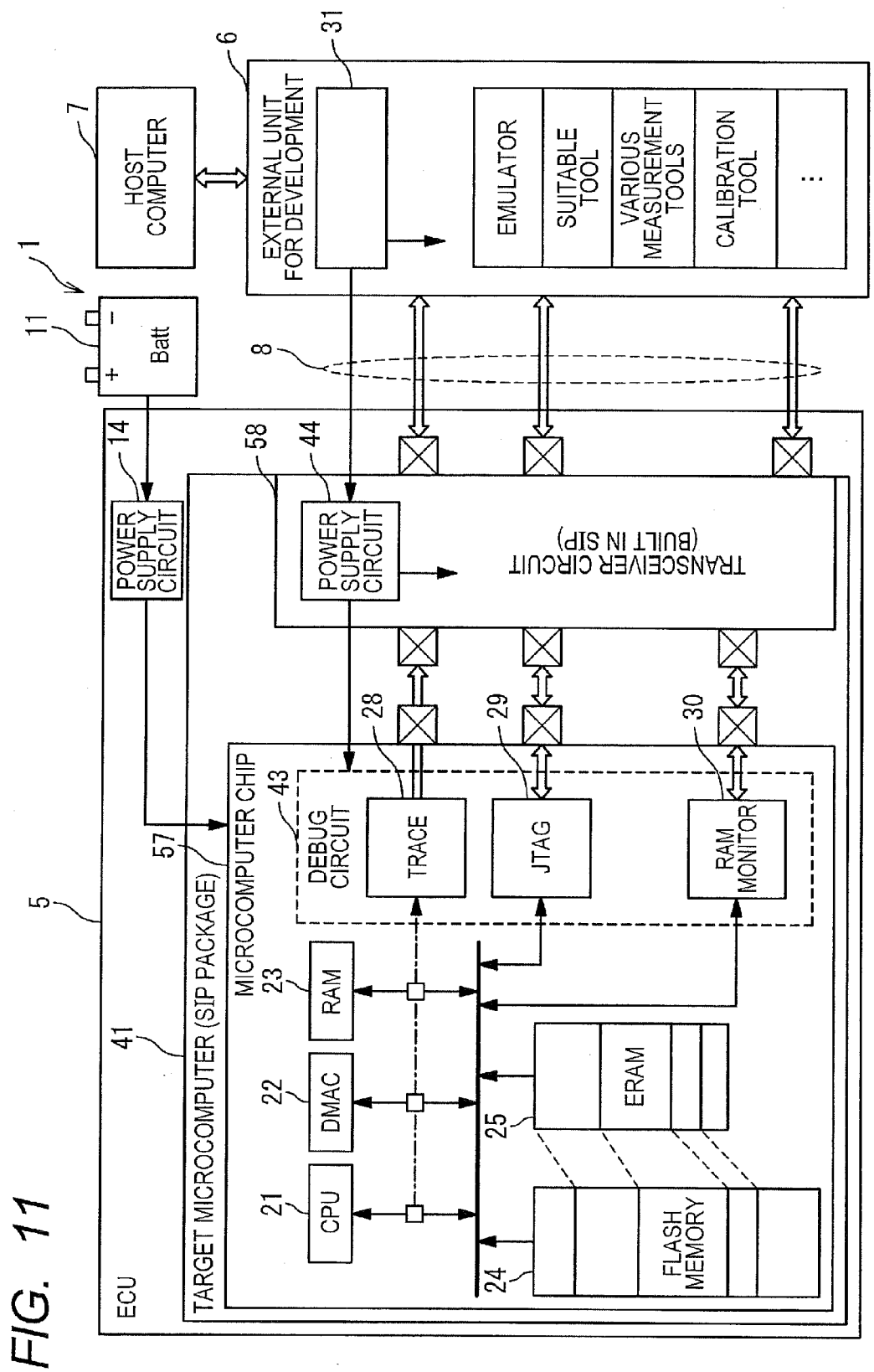
FIG. 11 is a block diagram illustrating the configuration of the debug system 1 according to a sixth embodiment.

A sixth embodiment of the present invention will now be described. FIG. 11 is a block diagram illustrating the configuration of the debug system 1 according to the sixth embodiment. The debug system 1 according to the sixth embodiment is configured so that the target microcomputer 41 mounted in the ECU 5 is formed by a SIP (System In Package). As shown in FIG. 11, a microcomputer chip 57 in the target microcomputer 41 according to the sixth embodiment is formed by a single semiconductor device (IC chip). Similarly, a transceiver circuit chip 58 is formed by a single semiconductor device (IC chip). The transceiver circuit chip 58 according to the sixth embodiment includes the power supply circuit 44, which is capable of supplying electrical power to another circuit, as is the case with the transceiver circuit 42 according to the fourth embodiment.

In the debug system 1 according to the sixth embodiment, the target microcomputer 41 is offered as a SIP. Therefore, it is not necessary to perform a process of sealing the transceiver circuit chip 58 to another package. Further, the configuration employed in the sixth embodiment makes it possible to manufacture the microcomputer chip 57 and the transceiver circuit chip 58 as different semiconductor devices (IC chips). Consequently, an optimum design technique and manufacturing technique can be applied as appropriate for their respective functions.

Even when the above-described configuration is employed, a power supply for the microcomputer chip 57 can be separated from a power supply for the transceiver circuit chip 58. More specifically, the power supply circuit 44 of the transceiver circuit chip 58 generates electrical power for the transceiver circuit itself and electrical power to be supplied to the debug circuit 43. Configuring the target microcomputer 41 to include the microcomputer chip 57 and the transceiver circuit chip 58 as described above decreases the amount of electrical power consumed when the debug circuit 43 is not used. Therefore, the power supply circuit 14 in the ECU is requested to supply only the electrical power required for the target microcomputer 41. Consequently, the sixth embodiment provides the same advantages as the fourth and fifth embodiments. Further, as the target microcomputer 41 is offered as a SIP, the distance between the microcomputer chip 57 and the transceiver circuit chip 58 is extremely short. This makes it possible to decrease the amount of electrical power that is slightly consumed in a power supply path, and use a mounting method that excels in electrical characteristics. In the debug system 1 according to the sixth embodiment, the internal configuration of the transceiver circuit chip 58 is not limited. Therefore, the transceiver circuit chip 58 may include the circuits illustrated in FIGS. 8A to 8C, as is the case with the fourth embodiment.

While the embodiments of the present invention have been described in detail, the present invention is not limited to the specific embodiments described above. It is to be understood that many variations and modifications of the present invention may be made without departing from the spirit and scope of the present invention.

What is claimed is:

1. A debug system comprising:
an electronic control unit for automobiles placed in an engine room, the electronic control unit comprising a microcomputer for controlling an operation of a control target associated with an automotive system and a transceiver circuit that is capable of communicating data with the microcomputer;
an external unit for development placed in a bench room that is capable of rapidly communicating data with the transceiver circuit, the external unit used to check operations of the electronic control unit; and
a wire coupling the transceiver circuit to the external unit for development, that is capable of reaching the bench room from the engine room,
wherein the electronic control unit includes a power supply unit for supplying electrical power to the microcomputer, as designed with a capacity to operate the microcomputer under normal operation in the automobile, using an in-vehicle battery, the electronic control unit being insufficient to supply power to both the microprocessor and the transceiver circuit at a speed sufficient for development testing of the electronic control unit using the wire coupling to the transceiver to the external unit, and
wherein the transceiver circuit operates on electrical power supplied from an external power supply unit, which differs from the power supply unit included in the electronic control unit.

2. The debug system according to claim 1,
wherein the microcomputer includes a debug circuit that communicates data with the transceiver circuit when the electronic control unit is tested, and
wherein the debug circuit operates in accordance with electrical power supplied from the transceiver circuit.

3. The debug system according to claim 2, wherein the transceiver circuit includes a built-in power supply unit that generates electrical power to be supplied to the debug circuit in accordance with the electrical power supplied from the external power supply unit; and wherein the debug circuit operates on electrical power supplied from the built-in power supply unit without being dependent on the electrical power from the power supply unit that supplies electrical power to the microcomputer.

4. The debug system according to claim 1, wherein the external power supply unit is arranged in the external unit for development, and
wherein the transceiver circuit operates on electrical power supplied from the external power supply unit in the external unit for development through the wire.

5. The debug system according to claim 1, wherein the transceiver circuit is arranged in a housing that forms the electronic control unit.

6. The debug system according to claim 1, further comprising:
a housing that houses the electronic control unit,
wherein the transceiver circuit is arranged external to the housing.

7. The debug system according to claim 1,
wherein the microcomputer is formed by a single microcomputer chip;
wherein the transceiver circuit is formed by a single transceiver circuit chip, and wherein the electronic control unit is formed by a SiP (system in package) module that includes the microcomputer chip and the transceiver circuit chip.

8. The debug system according to claim 1, wherein the transceiver circuit includes a buffer circuit for maintaining the performance of communication between the microcomputer and the external unit for development.

9. The debug system according to claim 1, wherein the transceiver circuit includes a short-distance input/output buffer that is to be coupled to the microcomputer, a long-distance transceiver that is to be coupled to the external unit for development, and a FIFO buffer arranged between the short-distance input/output buffer and the long-distance transceiver.

10. The debug system according to claim 9,
wherein the transceiver circuit further includes a protocol conversion control circuit, and
wherein the protocol conversion control circuit converts data supplied from the microcomputer into a long-distance communication protocol optimal for long-distance communication and converts data transmitted by the long-distance communication protocol into a communication protocol optimal for the microcomputer.

11. The debug system according to claim 2, wherein the debug circuit includes a trace section that directly reads an operation of a CPU provided for the microcomputer, a JTAG section that establishes communication required for debugging between the external unit for development and the microcomputer and controls the debug circuit, and a RAM monitor section that reads data from a RAM provided for the microcomputer.

12. An electronic control unit for automobiles placed in an engine room, said electronic control unit comprising:
a microcomputer that controls an operation of a control target associated with an automotive system;
a transceiver circuit that is arranged between the microcomputer and an external unit for development placed in a bench room to rapidly communicate data with the external unit for development, the external unit used to check an operation of the electronic control unit; and
a power supply unit that supplies electrical power to the microcomputer, the power supply designed with a capacity to operate the microcomputer under normal operation in the automobile, using an in-vehicle battery, the power supply unit being insufficient to supply power to both the microcomputer and the transceiver at a speed sufficient during development testing of the electronic control unit using the wire coupling the transceiver to the external unit,
wherein the microcomputer includes a debug circuit that communicates data with the transceiver circuit during testing, and
wherein the transceiver circuit operates on electrical power supplied from an external power supply unit, which differs from the power supply unit included in the electronic control unit, through a wire coupling the transceiver circuit to the external unit for development, that is capable of reaching the bench room from the engine room.

13. The electronic control unit according to claim 12, wherein the debug circuit operates in accordance with electrical power supplied from the transceiver circuit.

14. The electronic control unit according to claim 13,
wherein the transceiver circuit includes a built-in power supply unit that generates electrical power to be supplied to the debug circuit in accordance with the electrical power supplied from the external power supply unit, and
wherein the debug circuit operates on electrical power supplied from the built-in power supply unit without being dependent on the electrical power supplied from the power supply unit that supplies electrical power to the microcomputer.

15. The electronic control unit according to claim 12, wherein the transceiver circuit is arranged in a housing that forms the electronic control unit.

16. The electronic control unit according to claim 12,
wherein the microcomputer is formed by a single microcomputer chip;
wherein the transceiver circuit is formed by a single transceiver circuit chip, and
wherein the electronic control unit is formed by a SiP (system in package) module that includes the microcomputer chip and the transceiver circuit chip.

17. The electronic control unit according to claim 12, wherein the transceiver circuit includes a buffer circuit for maintaining the performance of communication between the microcomputer and the external unit for development.

18. The electronic control unit according to claim 12, wherein the transceiver circuit includes an input/output buffer that is to be coupled to the microcomputer, a transceiver that is to be coupled to the external unit for development through the wire, and a FIFO buffer arranged between the input/output buffer and the transceiver.

19. The electronic control unit according to claim 12, wherein the transceiver circuit further includes a protocol conversion control circuit; and wherein the protocol conversion control circuit converts data supplied from the microcomputer into a long-distance communication protocol optimal for long-distance communication and converts data transmitted by the long-distance communication protocol into a communication protocol optimal for the microcomputer.

20. The electronic control unit according to claim 13, wherein the debug circuit includes a trace section that directly reads an operation of a CPU provided for the microcomputer, a JTAG section that establishes communication required for debugging between the external unit for development and the microcomputer and controls the debug circuit, and a RAM monitor section that reads data from a RAM provided for the microcomputer.

* * * * *